Oct. 1, 1957    R. H. MATHES    2,808,583
OBJECT LOCATOR SYSTEM
Filed Jan. 24, 1951    2 Sheets-Sheet 2
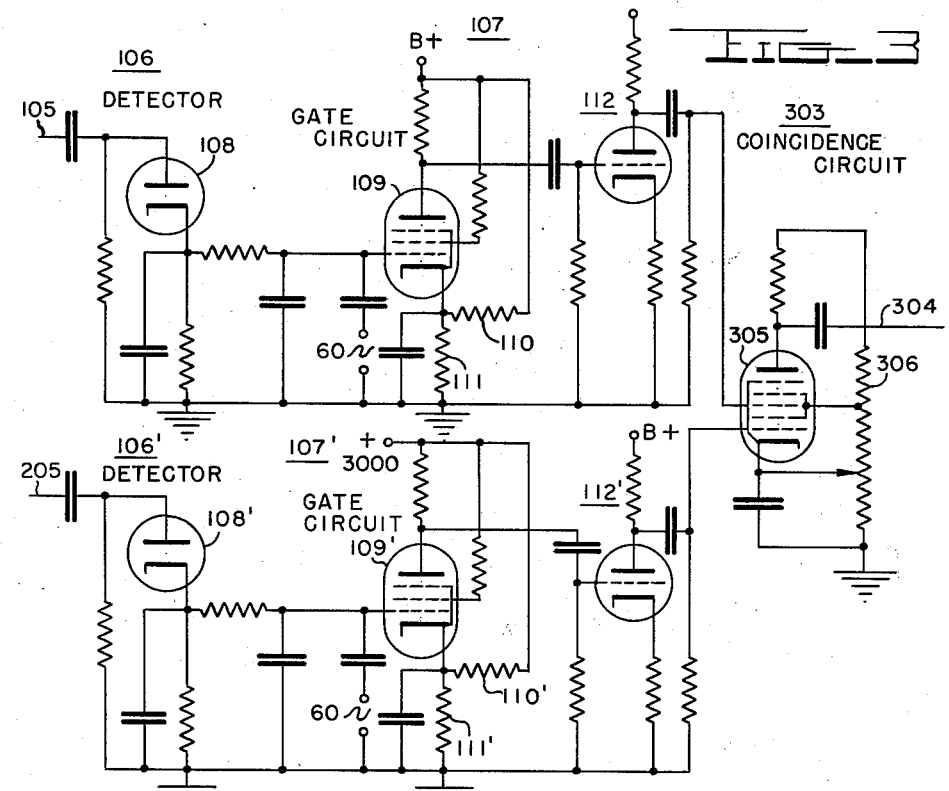
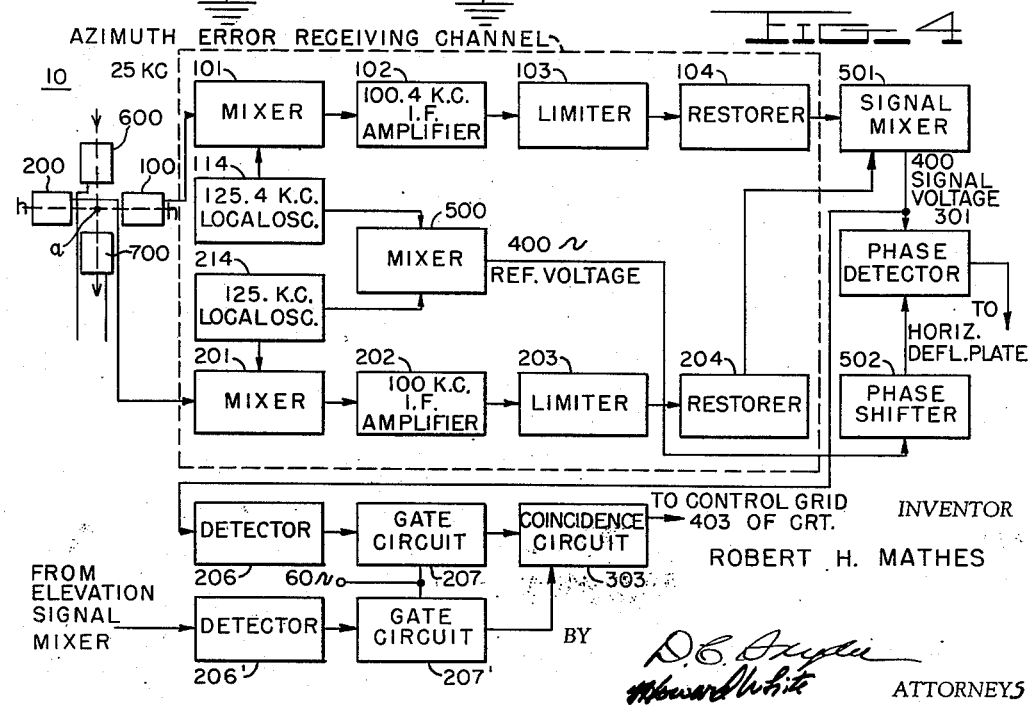
INVENTOR
ROBERT H. MATHES
BY
ATTORNEYS United States Patent Office 2,808,583
Patented Oct. 1, 1957

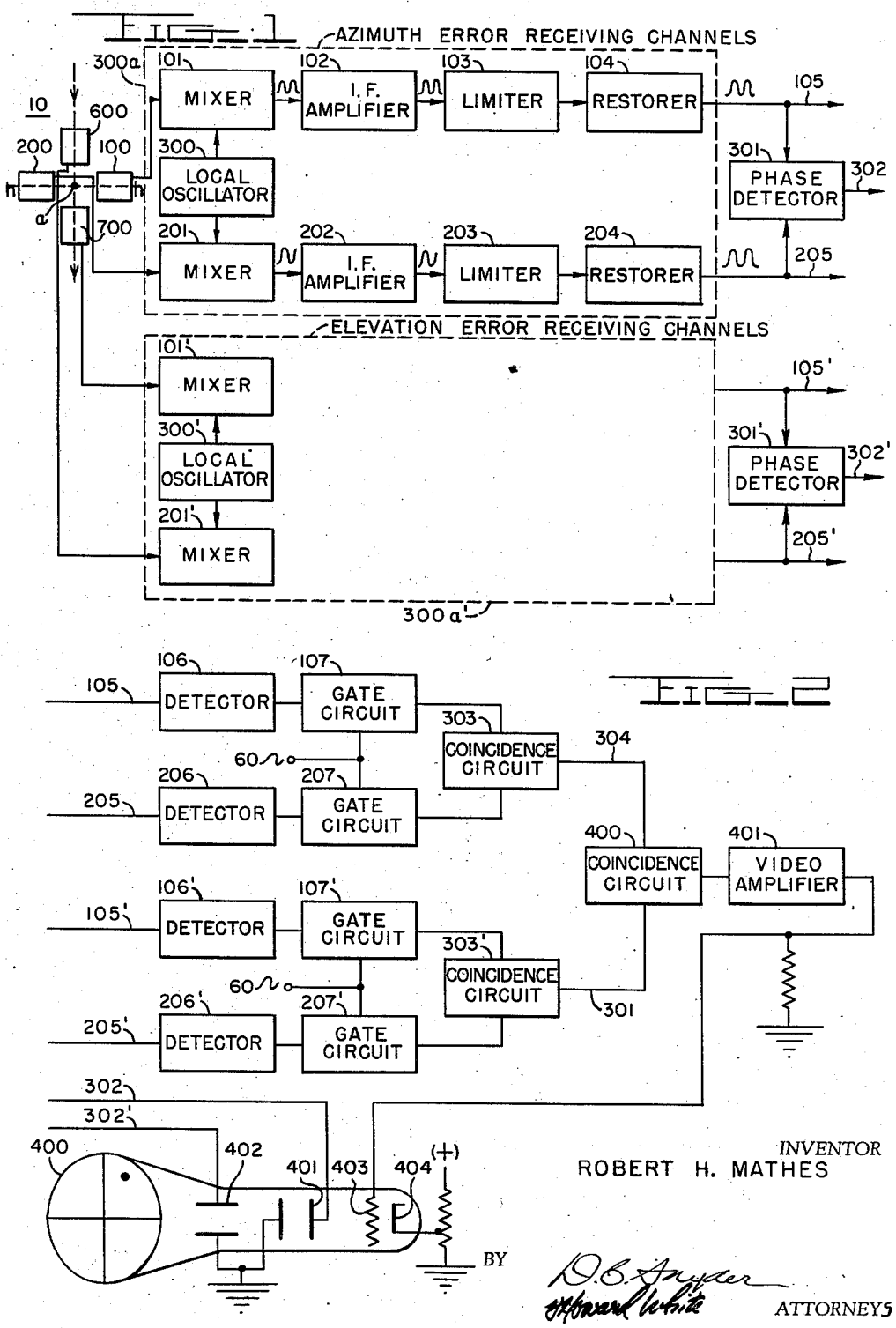

2,808,583

OBJECT LOCATOR SYSTEM

Robert H. Mathes, Washington, D. C.

Application January 24, 1951, Serial No. 207,643

7 Claims. (Cl. 343—113)

(Granted under Title 35, U. S. Code (1952), sec. 266)

This invention relates to direction finding apparatus. More specifically, this invention relates to a system for indicating azimuth and elevation error between a given line relative to a sound or electromagnetic receiving means, and the direction of a source of sound or electromagnetic energy whereby an indication of azimuth and elevation error is obtained by the position of a spot on the cathode ray tube face.

It is well known in the art to obtain an indication of azimuth and elevation error by means of the location of a spot on a cathode ray tube face. (See U. S. patent to Jansky, 2,437,695.)

It is also well known to obtain voltages whose phase is proportional respectively to the azimuth and elevational error as shown by the U. S. patent to Johnstone 2,419,219 and then deriving a direct current voltage proportional to this phase with which the spot on a cathode ray tube is deflected.

However, these prior art means involve more complicated and less effective apparatus and also are more susceptible to false indications if any circuit breakdown occurs.

The prior art systems utilizing spot indications were either inaccurate because of the large spots used or materially lessened tube life if sharp spots were used.

One object of the invention is therefore to provide an improved cathode ray tube indicating system for an object or signal locator system giving an indication of azimuth and elevation error which reduces the possibility of an erroneous indication.

Another object of the invention is to provide a novel system for utilizing a relatively sharp spot on the cathode ray tube without materially lessening the tube life.

Still another object of the present invention is to provide an improved cathode ray tube indicating system for an object locator system similar to that disclosed in U. S. application Serial No. 199,275 for R. H. Mathes entitled "Direction Indicator" filed December 5, 1950, which will be substantially free of false indications.

These and other objects of the present invention will become apparent when reference is made to the following description and attached drawings wherein:

Figure 1 is a block diagram showing the circuit components used to obtain direct current voltages whose magnitude and polarity are respectively proportional to the degree and sense of elevation and azimuth error.

Figure 2 shows the various circuit connections made to the control elements of the cathode ray tube and also the circuit for preventing pulse indications and causing excess wear on the cathode ray tube screen.

Figure 3 is a detailed schematic circuit of the detector gate, and coincidence circuit used to prevent a circuit failure from giving a false scope indication and to prevent undue screen wear.

Figure 4 is another embodiment of the present invention.

The present invention includes apparatus for use with an elevation and azimuth error indication system wherein the magnitude of the elevation and azimuth error is indicated by the position of a spot on the face of a cathode ray tube and includes a plurality of gate circuits which permit a low frequency pulsating voltage to be fed to a coincidence circuit only when all of the respective azimuth and elevation error signal channels are operative in the output circuits of the radio receiver apparatus. There is no indication on the screen of the cathode ray indicator tube unless there is an output from the coincidence circuit. Since the coincidence circuit only passes the low frequency control voltage when the error signals are present in the receiver channel output, the spot will only appear when the receiving channels are properly operating and the spot will not materially lessen the life of the cathode ray tube because the spot is being modulated at a low frequency rate.

For purposes of clarity the present invention will be described in connection with a sound detecting system, it being understood that the principles herein disclosed readily lend themselves to other applications. For example, the present invention could be used to detect the direction of a source of an electromagnetic wave rather than a sound wave.

Referring now in particular to Figure 1 there is disclosed the teachings of the present invention as applied to the type of sound detecting device similar to that disclosed in the copending application, Serial No. 16,893 filed March 25, 1948, by Harold Saxton, entitled "Sector Scan Indicator." The detecting means 10 comprises respectively right, left, upper, and lower sound detecting elements 100, 200, 600 and 700 or alternatively derived equivalents. These elements may be any of the well known sound detecting elements (such as exemplified by the crystal microphone, etc.) which deliver an electrical voltage in response to a physical displacement. These elements should be unidirectional to the extent that there is no 180 degree ambiguity. The directivity pattern of these elements must be overlapping and extend generally in a direction along the line of symmetry of these elements. The said detecting elements are symmetrically arranged about a point $a$ and are preferably moveable together by apparatus not shown as a unit both in azimuth and in elevation.

Of course, if desired, the said detecting elements could be used to transmit a source wave as well as to receive this kind of energy. For cases where the object to be located generates insufficient sound waves of its own, this must be done in which case the echo sound wave will be the signal detected by detecting means 10.

Detecting elements 100—200 are located equi-distant from point $a$ and along a horizontal line $h$—$h$. These elements will be referred to as the azimuth error detecting means.

Likewise detecting elements 699—700 are located equi-distant from point $a$ but along a vertical line $v$—$v$. These latter elements will be referred to as elevation error detecting means.

It should be apparent that a sound wave originating along the axis of symmetry of the detector elements will strike all of said elements simultaneously, and the electrical impulses delivered by these elements will all be in phase. If however the line of symmetry is exactly vertically below or above the sound source, then the sound wave will strike respectively the upper element 600 or the lower element 700 first so that the phase of the electrical voltage delivered by element 700 for example will respectively either lag or lead the voltage delivered by element 600. In this last example, the voltages delivered by the azimuth error detecting elements will of course be in phase. The magnitude and sense of the phase relationships of the voltages at the output of the detecting element pairs 100—200, 600—700 is thus a measure of the azimuth and elevation error sense.

From what has already been said, it is apparent that if the line of symmetry is horizontally disposed to one side of the sound source then the voltage delivered by element 200 will lag or lead the other azimuth error detecting element depending on whether the line of symmetry is either respectively to the right or to the left of this line.

By means of conventional phase detectors the phase differences of the signal voltages are converted to direct current voltages which are used to deflect a spot on the face of a cathode ray tube.

For zero azimuth and elevation error the spot will fall in the center of the cathode ray tube screen. The spot will move above or below the center of the cathode ray tube for any given elevation error and will move to the right or left of center for any azimuth error.

To each of the aforementioned sound detecting elements is coupled distinct radio receiving channels. The radio channels associated with the azimuth error detecting elements 100—200 may be identical and as shown in Figure 1 comprise mixers, 101—201; intermediate frequency (I. F.) amplifiers 102, 202 coupled to said respective mixers; limiters 103, 203 coupled to said respective I. F. amplifiers; and restorers 104, 204 coupled to said respective limiters. A conventional local oscillator 300 coupled to both azimuth error receiving channels provides signals having the same intermediate frequency in the two azimuth channels which have a phase relation identical with that of the phase relationship between the voltages delivered by azimuth error detecting elements 100—200.

The azimuth error receiving channel 300a, just described, is identical as to component with the elevation error receiving channel 300a' and the latter has merely been shown in Figure 1 as a box outlined by dotted lines. It should be noted that the exact intermediate frequency used with channels 300a and 300a' are not important and so may be of different values.

The purpose of the limiter circuits 103 and 203 are to clip the positive and negative peaks of the intermediate frequency signals to eliminate any amplitude interference or distortion which might have been introduced either outside of the apparatus or in the stage previous to the limiters. This is very important if the location of the spot on the cathode ray tube is to be an accurate indication of the azimuth and elevation error. The limiter circuit is conventional and well known in the prior art so that no further discussion of it is considered necessary.

The restorers 104, 204 are merely conventional radio frequency amplifiers tuned to the intermediate frequency so that only the fundamental sinusoidal frequency of the clipped or limited input signal appear in their output.

The phase detectors 301 and 301' may be any of the well known prior art devices which develop a direct current voltage which has a magnitude and polarity proportional to the sense and degree of the phase difference of the input voltages. (See for example, U. S. Patent 2,419,219 to Johnstone).

The output of phase detectors 301 and 301' are fed respectively to the horizontal and vertical deflecting plates 401 and 402 of cathode ray tube 400 shown in Fig. 2.

If for any reason there is no signal voltage present in one of the receiver channels, it is important that the observer of the cathode ray tube 400 be cognizant of this fact. It should be noted that the phase detectors 301, 301' (if they are of the type shown by U. S. Patent 2,419,219 to Johnstone) will give an output even if only one signal is fed thereto and so the spot will be deflected both horizontally and vertically even though one of the receiving channels becomes inoperative.

To eliminate such an undesirable result the gate and coincidence circuit shown in Figure 2 (see Figure 3 for circuit details of the detector, gate, limiter, and coincident circuits associated with the azimuth receiver channels) is utilized. Diode detectors 106, 206, 106', 206' are here shown respectively coupled to the output of the four receiving channels. These detectors deliver a direct current voltage proportional to the average amplitudes of the voltage fed to the detector input.

In the absence of a signal input to any of the diode detectors, the respective gate circuits coupled thereto are not operative to pass a 60 cycle voltage fed to the grid of the gate circuit tube 109, 109' etc. shown in Figure 3. (The details of circuits coupled to the elevation receiver channels are identical to the circuits shown in Figure 3 so that separate discussion and drawings of their circuit details have been omitted.) In such case, gate circuit tubes 109—109' are normally rendered non-conductive by the positive voltage fed to the respective cathodes by means of voltage divider 110—111. The amplitude of the 60 cycle voltage fed to the grid of the gate tubes is adjusted so that the positive voltage peaks still do not render the gate tubes conductive. As soon as signal voltages appear at the respective detector inputs, the direct current output of the detectors renders the gate tubes 109—109' conductive at least during the peaks of the 60 cycle voltages. The 60 cycle voltage pulse output of the gate circuits is then fed to respective signal grids of conventional phase inverter amplifiers 112—112'. The output thereof is fed to the respective signal grids of the coincidence tube 305. Due to the positive bias voltage applied to the cathode of the tubes of the coincidence circuit from a potentiometer 306 in Figure 3, no plate current is present in the coincidence tube unless both signal grids receive positive pulses from the output of phase inverters 112—112'. That is, the positive going portions of the voltages applied to the signal or control grids of coincidence tube overcome the effect of the cut-off bias effectively applied to the control grid from potentiometer 306.

Referring to Figure 2 again, coincidence circuits 303 and 303' are coupled to a further coincident circuit 400 which may be identical to the coincidence circuit 303 just described. Coincidence circuit 400 has an output consisting of 60 cycle pulsations only when all of the receiving channels are operating. These pulses are amplified by a conventional video amplifier 401 and are fed to the cathode ray tube intensity control grid 403 to modulate the spot of the cathode ray tube 400. In the absence of an output from coincidence circuit 400, the bias voltage applied to the cathode 404 of the cathode ray tube is sufficient to render the spot invisible on the cathode ray tube face. Thus when a spot does appear on the face of the cathode ray tube the observer can be substantially certain that he is receiving an accurate indication of azimuth and elevation error.

The circuits shown in Fig. 3 are exemplary only and any suitable circuits as are well known in the art may be substituted therefor.

A frequency of sixty cycles per second has been selected for the beam modulation rate because of the availability of such a frequency. Of course, a thirty cycle modulation rate, for example, would be more satisfactory than sixty cycles as far as saving cathode ray tube wear is concerned.

Figure 4, to which reference is now made, shows another embodiment of cathode ray tube indicating system utilizing a receiver system which is a modification of that disclosed in copending application 16,893, filed March 25, 1948 by Harold Saxton. For purposes of simplicity, only the azimuth error receiving channels have been shown, it being understood that the elevation error receiving channels operate on the same principle as the azimuth receiving channel and it is intended that exactly similar circuitry, or the equivalent, be utilized therein. The complete box diagram of the detector, gate, and coincidence circuit have been shown however. This second embodiment simplifies the coincidence and gate circuits by reducing the number of required circuits.

The same reference characters have been used where the components are identical to those shown in Figures 1 and 2.

The two azimuth receiving channels are almost identical with the exception that each channel has its own local oscillator 114 and 214 operating at different frequencies resulting in different intermediate frequencies being present in the output of respective mixers 101—201 to which the output of detecting elements 100—200 is coupled. These local oscillators are heterodyned together in a conventional mixer 500 (similar to mixer 101) producing in its output a third frequency which is the difference frequency of 400 cycles.

As in the embodiment of Figure 1 the output of mixers 101—201 are respectively coupled to restorers 104—204 through I. F. amplifiers 102—202 and limiters 103—203.

The difference frequency between the intermediate frequencies is also 400 cycles so the outputs from restorers 104 and 204 are fed to conventional mixer 501 (similar to mixer 101) producing in its output a 400 cycle signal voltage which varies in phase with respect to the local oscillator beat frequency in the same degree and in the same direction as the phase relation of the voltages delivered by azimuth detecting elements 100 and 200. However, if the voltages from detecting means 100, 200 are in phase then the phase of the 400 cycle signal voltage at the output of mixer 501 is not necessarily in phase with the local oscillator 400 cycle beat frequency. However, any change in phase of the voltages fed from detecting elements 100—200 will result in a corresponding change in phase, of the 400 cycle signal voltage. In order to give the observer an absolute reading of azimuth error rather than merely an indication of change in azimuth error, phase shifter 502 is coupled to the output of local oscillator beat mixer 500 to adjust the phase of the local oscillator beat frequency so that it is in phase with the 400 cycle signal voltage when the signal detected by azimuth detecting elements 100—200 has zero azimuth error. A dummy target not shown is used for this purpose consisting of any suitable sound generating device rigidly attached to the detecting elements (which are mounted to be moveable as a unit) along the axis of symmetry of the detecting means 10.

The embodiment of Figure 1 does not require a dummy target nor a phase shifting device since the phase differences of the signal voltages are directly measured by the phase detector.

In the second embodiment shown in Figure 4, the output of the phase shifter 502 and the signal beat frequency mixer 501 are fed to the phase detector 301 whose output direct current voltage is fed to the horizontal deflection plate 401.

It should be noted that if any one of the azimuth receiver channels become inoperative, the 400 cycle beat frequency signal voltage at the output of mixer azimuth 501 will immediately disappear. This fact is taken advantage of in the simplification of the gate and coincidence circuits because now only two rather than four detector-gate circuits are needed since each detector is now coupled in the respective outputs of the azimuth and elevation signal mixers.

Thus the output from the signal mixer 501 is fed to detector 206, and the output from the elevation signal mixer (not shown in drawing) is fed to detector 206'. Thus the gate circuits 207 and 207' will only pass the 60 cycle modulation voltage to coincidence circuit 303 when all of the receiver channels are operating satisfactorily.

It is to be understood that many modifications can be made by those skilled in the art without deviating from the scope of the present invention.

The invention described herein may be manufactured and used by or for the Government of the United States of America for governmental purposes without the payment of any royalties thereon or therefor.

What is claimed is:

1. An object locator system for detecting the azimuth and elevation of energy emanating or reflected from a remote object comprising a first pair of energy detecting means having overlapping zones of receptivity physically disposed along a first given line, a second pair of energy detecting means having overlapping zones of receptivity with each other and with said first pair of energy detecting means disposed along a second given line which is at right angles with respect to said first given line, a separate receiving channel coupled to each of said detecting means, a first means associated with the receiving channels which are coupled to said first pair of detecting means for obtaining a first pair of voltages whose relative phase is proportional to the relative phase of the energy received by said first pair of detecting means, means associated with the receiving channels which are coupled to said second pair of detecting means obtaining a second pair of voltages whose relative phase is proportional to the relative phase of the energy received by said second pair of detecting means, first and second phase comparator means for deriving direct current voltages whose magnitude and polarity are respectively proportional to the degree and sense of the phase differences of said first and second pair of voltages, a cathode ray tube including horizontal and vertical deflecting means, a cathode and an intensity control electrode, a third means coupling said first and second phase comparator means respectively to said horizontal and vertical deflecting means, biasing means coupled between said cathode and intensity control electrode for normally rendering the trace on the screen of said cathode ray tube substantially invisible, means coupled between the output of said receiving channels and said biasing means for increasing the intensity of said trace to the visible level only when there is a signal output present in all of said receiving channels.

2. An object locator system for detecting the azimuth and elevation of energy emanating or reflected from a remote object comprising a first pair of energy detecting means having overlapping zones of receptivity physically disposed along a first given line, a second pair of energy detecting means having overlapping zones of receptivity with each other and with said first pair of energy detecting means disposed along a second given line which is at right angles with respect to said first given line, a first and second pair of superheterodyne receiving channels coupled respectively to said first and second pairs of energy detecting means, the intermediate frequency of the receiving channels associated with each of said respective pairs of detecting means having the same intermediate frequency, a first and second phase comparison means coupled respectively to the output of the intermediate frequency stages associated with said first and second pair of receiving channels for deriving direct current voltages proportional to the degree and sense of the phase differences of the respective intermediate frequency signal voltages, a cathode ray tube including horizontal and vertical deflecting means, a cathode and an intensity control electrode, a first means coupling said first and second phase comparison means respectively to said horizontal and vertical deflection means, a source of biasing voltage coupled to said intensity control electrode for normally rendering the spot on the screen of said cathode ray tube substantially invisible, separate detector means coupled to the output of the intermediate frequency amplifiers of the respective receiving channels for deriving unidirectional voltages from said respective intermediate frequency voltages, a source of low frequency voltage, separate gate circuits each coupled to a respective one of said separate detector means and to said source of low frequency voltage each operative in response to the unidirectional voltage output of a respective one of said separate detector means to couple the voltage from said low frequency voltage source to a pair of respective output terminals, coincidence circuit means coupled between said respective output terminals and the intensity control circuit associated with said control electrodes of the cathode ray tube operative to couple said low frequency voltage to said intensity control electrode only when the said low frequency voltage exists across all of said respective output terminals whereby the spot on the said screen becomes visible and modulated at a low frequency rate only when the apparatus is properly operating.

3. An object locator system for detecting the azimuth and elevation of energy emanating or reflected from a remote object comprising a first pair of energy detecting means having overlapping zones of receptivity physically disposed along a first given line, a second pair of energy detecting means having overlapping zones of receptivity with each other and with said first pair of energy detecting means disposed along a second given line which is at right angles with respect to said first given line, a separate superheterodyne receiving channel including a local oscillator therefor coupled to each of said energy detecting means, the local oscillators of the receiver channels associated with each pair of energy detecting means operative at different frequencies whereby said receiver channels have distinct intermediate frequencies, first and second means respectively coupled to the local oscillators for producing the beat frequency of the local oscillators associated with each pair of detecting means, third and fourth means coupled with the receiver channels associated with said first and with said second pair of detecting elements respectively for obtaining the beat frequencies of the respective intermediate frequencies coupled thereto, a first and second phase comparator means coupled respectively to said first and second means and to said third and fourth means for deriving direct current voltages which are proportional in magnitude and polarity to the relative phase difference of the respective voltages fed thereto, a cathode ray tube including horizontal and vertical deflecting means, a cathode electrode, and an intensity control electrode, means coupling the output of said first and second phase comparator means respectively to the horizontal and vertical deflecting means of said cathode ray tube, a source of biasing voltage coupled to said intensity control electrode for normally rendering the spot on the screen of said cathode ray tube substantially invisible, separate detector means coupled respectively to the output of said third and fourth means for deriving a unidirectional voltage proportional to the beat frequency voltage in the output thereof, a source of low frequency voltage, a first and second gate circuit coupled respectively to said separate detector means and to said source of low frequency voltage each operative only in response to the unidirectional voltage output of a respective one of said separate detector means to couple the voltage from said low frequency voltage source to a pair of respective output terminals, coincidence means coupled between said respective output terminals and the intensity control circuit associated with said control electrode of the cathode ray tube operative to couple said low frequency voltage to said intensity control electrode only when the said low frequency voltage exists across all of said respective output terminals whereby the spot on the said screen becomes visible and modulated at a low frequency rate only when the apparatus is properly operating.

4. An object locator system for detecting the azimuth and elevation of energy emanating or reflected from a remote object comprising a first pair of energy detecting means having overlapping zones of receptivity physically disposed along a first given line, a second pair of energy detecting means having overlapping zones of receptivity with each other and with said first pair of energy detecting means disposed along a second given line which is at right angles with respect to said first given line, a separate superheterodyne receiving channel including a local oscillator therefor coupled to each of said energy detecting means, the local oscillators of the receiver channels associated with each pair of energy detecting means operative at different frequencies whereby said receiver channels have distinct intermediate frequencies, first and second means respectively coupled to the local oscillators for producing the beat frequency of the local oscillators associated with each pair of detecting means, third and fourth means coupled with the receiver channels associated with said first and with said second pair of detecting elements respectively for producing the beat frequencies of the respective intermediate frequencies coupled thereto, a first and second phase comparator means coupled respectively to said first and second means and to said third and fourth means for deriving direct current voltages which are proportional in degree magnitude and polarity to the relative phase difference of the respective voltages fed thereto, a cathode ray tube including horizontal and vertical deflecting means, a cathode and intensity control electrode, and means coupling the output of said first and second phase comparator means respectively to the horizontal and vertical deflecting means of said cathode ray tube.

5. In a signal locator system which includes a directional signal detecting means coupled to one or more receiving channels and a cathode ray tube indicator including an intensity control electrode, and where the position of the electron beam spot on the screen of the cathode ray tube gives an indication of azimuth and elevation angle error between a reference axis relative to signal detecting means and the signal source, the combination comprising a source of biasing voltage coupled to the intensity control electrode of said cathode ray tube for rendering the spot normally invisible, a source of low frequency voltage, a gate circuit coupled to the output of said receiving channels and to said source of low frequency voltage operative only in response to the presence of signal voltages in said receiving channels to couple said low frequency voltage to the intensity control electrode of said cathode ray tube whereby the spot becomes visible and is modulated at said low frequency rate.

6. In a signal locator system which includes a directional energy detecting means and a plurality of signal receiving channels coupled thereto including a cathode ray tube indicator having an intensity control electrode and where the position of the electron beam spot on cathode ray tube screen gives an indication of azimuth and elevation angle error between a reference axis relative to signal detecting means and the signal source, the combination comprising a source of biasing voltage coupled to the intensity control electrodes of said cathode ray tube for rendering the spot normally invisible, a source of low frequency voltage, separate means coupled to output of each of said receiving channels and also to said low frequency voltage source operative only to couple said low frequency voltage to a pair of output terminals when signals are present in the output of said respective receiving channels, coincidence circuit means coupled between said separate means and the intensity control means of said cathode ray tube operative to couple said low frequency voltage thereto only when all of said separate means are operative whereby the spot on the screen of the cathode ray tube is visible and modulated only when all of said signal receiving channels are operating properly.

7. In a signal locator system which includes a directional signal detecting means coupled to a plurality of receiving channels, and a cathode ray tube indicator including an intensity control electrode where the position of the electron beam spot on the screen of the cathode ray tube gives an indication of azimuth and elevation angle error between a reference axis relative to signal detecting means and the signal source, the combination comprising a source of biasing voltage coupled to the intensity control electrode of said cathode ray tube for rendering the spot normally invisible, a source of low frequency voltage, a gate circuit coupled to the output of said receiving channels and to said source of low frequency voltage operative only in response to the presence of signal voltages in all of said receiving channels to couple said low frequency voltage to the intensity control electrode of said cathode ray tube whereby the spot becomes visible and is modulated at said low frequency rate.

References Cited in the file of this patent

UNITED STATES PATENTS

| | | |
|---|---|---|
| 2,422,073 | Bond | June 10, 1947 |
| 2,422,122 | Norton | June 10, 1947 |
| 2,422,123 | Norton | June 10, 1947 |
| 2,490,051 | Hardy | Dec. 6, 1949 |
| 2,547,028 | Libby et al. | Apr. 3, 1951 |
| 2,571,051 | Mizen | Oct. 9, 1951 |
| 2,608,683 | Blewett | Aug. 26, 1952 |